June 5, 1956 P. M. FISCHER 2,749,493
SPEED REGULATING AND CURRENT LIMIT MOTOR CONTROL SYSTEM
Filed Aug. 26, 1953 2 Sheets-Sheet 1

Inventor
Paul M. Fischer
By W. C. Lyon
Attorney

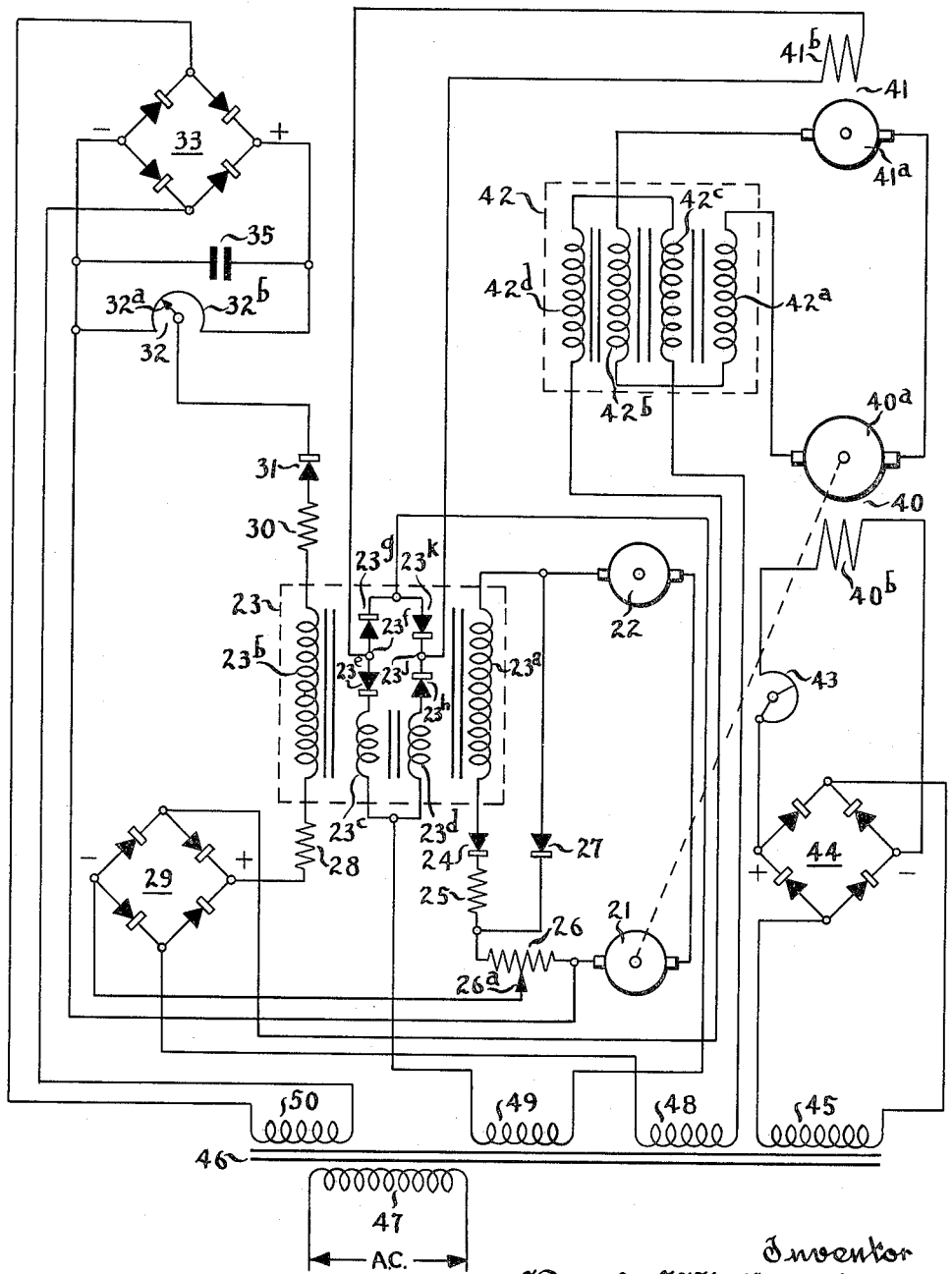

United States Patent Office 2,749,493
Patented June 5, 1956

2,749,493

SPEED REGULATING AND CURRENT LIMIT MOTOR CONTROL SYSTEM

Paul M. Fischer, Milwaukee, Wis., assignor to Cutler-Hammer, Inc., Milwaukee, Wis., a corporation of Delaware Application August 26, 1953, Serial No. 376,589

10 Claims. (Cl. 318—142)

This invention relates to speed regulating and current limit motor control systems.

It is a primary object of the present invention to provide an improved speed regulating, and current limit control system characterized by low steady state error, relatively high system stability and sharp current limit action.

Another object is to provide a novel voltage comparison circuit for the speed regulating control element of a regulator which automatically limits the voltage difference which may be developed across such element to protect the same against excessive voltage.

A further object is to provide a novel voltage comparison circuit for the current limit control element of the aforementioned regulator in which the motor current signal voltage is supplemented by a portion of the voltage difference in the voltage comparison circuit for the speed regulating control element for increasing the sharpness of current limit action.

Other objects and advantages of the invention will hereinafter appear.

The accompanying drawings illustrate preferred embodiments of the invention which will now be described, it being understood that the embodiments illustrated are susceptible of various modifications without departing from the scope of the appended claims.

In the drawings:

Fig. 3 is a diagrammatic showing of an adjustable voltage drive incorporating the invention.

Figure 1:
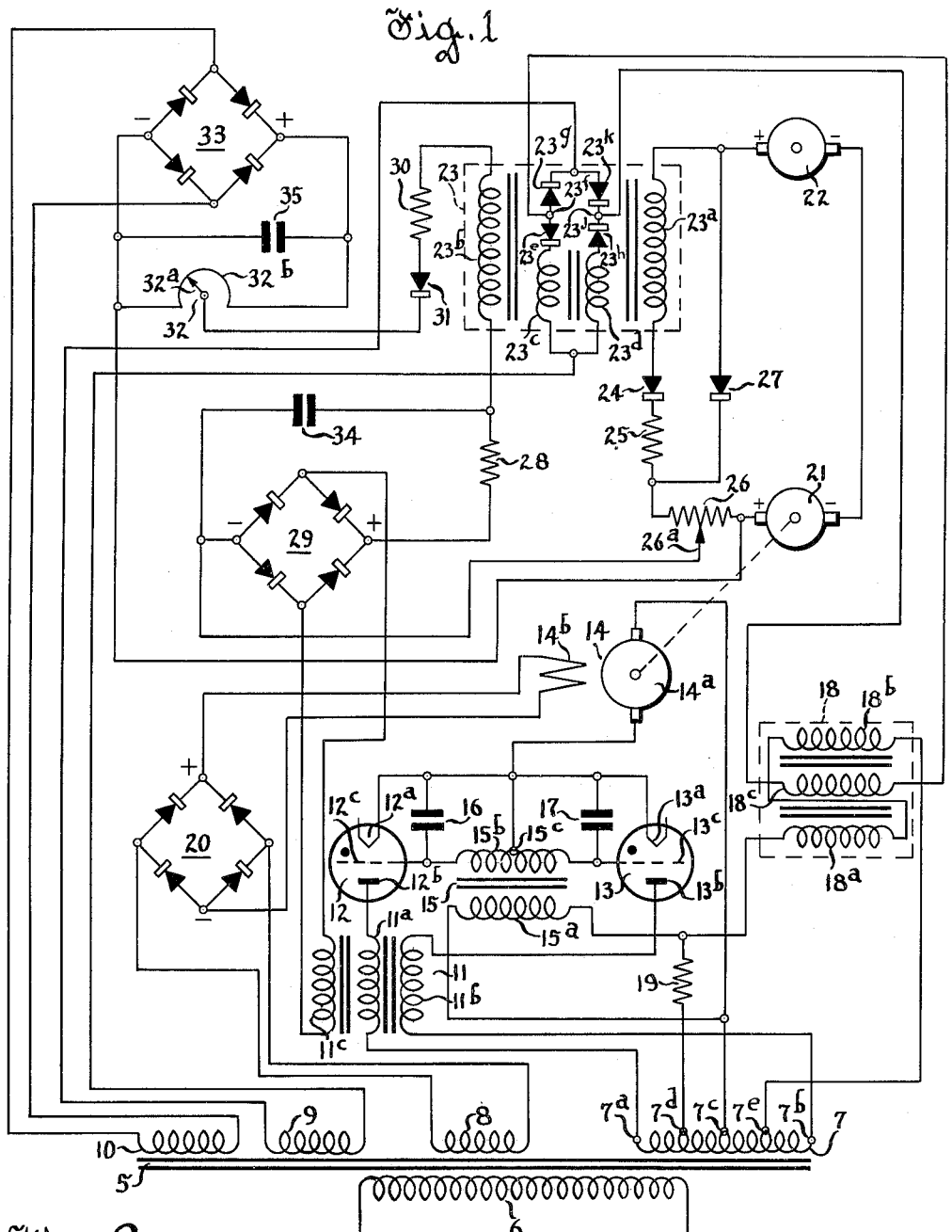
Figure 1 is a diagrammatic showing of a rectified alternating current control system for a D. C. motor incorporating the invention.

Referring to Fig. 1 the numeral 5 generally designates a transformer having a primary winding 6, which may be assumed to be connected to a suitable source of alternating voltage supply, and having secondary windings 7, 8, 9 and 10. Secondary winding 7 is provided with end terminals 7$^a$ and 7$^b$, center tap terminal 7$^c$ and intermediate tap terminals 7$^d$ and 7$^e$. End terminal 7$^a$ is connected in series with an input winding 11$^a$ of a current transformer 11 to the anode 12$^b$ of a gaseous electron tube 12, which is also provided with a cathode 12$^a$ and a control electrode 12$^c$. End terminal 7$^b$ is connected in series with another input winding 11$^b$ of current transformer 11 to the anode 13$^b$ of a tube 13, like tube 12. Tube 13 is also provided with a cathode 13$^a$ and a control electrode 13$^c$. The cathodes 12$^a$ and 13$^a$ of tubes 12 and 13 are connected together to one terminal of armature 14$^a$ of a direct current motor 14. The other armature terminal of motor 14 is connected to center tap terminal 7$^c$ of secondary winding 7.

The control electrodes 12$^c$ and 13$^c$ of tubes 12 and 13 are connected together, in series with a secondary winding 15$^b$ of a transformer 15, which has a primary winding 15$^a$. Secondary winding 15$^b$ has a center tap terminal 15$^c$ which is connected to the point common to cathodes 12$^a$ and 13$^a$ and the first mentioned motor armature terminal. A filter capacitor 16 is connected between the control electrode 12$^c$ and the cathode 12$^a$ of tube 12, and a similar filter capacitor 17 is connected between the control electrode 13$^c$ and cathode 13$^a$ of tube 13.

The primary winding 15$^a$ of transformer 15 is connected at one end terminal to center tap terminal 7$^c$ of secondary winding 7$^a$ and is connected at its other end terminal in series with A. C. windings 18$^a$ and 18$^b$ of a saturable reactor 18 to intermediate tap terminal 7$^e$ of winding 7. The point common between winding 15$^a$ and 18$^a$ is connected in series with a resistor 19 to intermediate tap terminal 7$^d$ of winding 7. As will be apparent, winding 15$^a$ of transformer 15, windings 18$^a$ and 18$^b$ of saturable reactor 18, and resistor 19 comprise a phase shift network, whereby, in accordance with the energization of D. C. winding 18$^c$ of reactor 18, the potential applied on the control electrode of tubes 12 and 13 may be shifted in time-phase with respect to the potentials applied to the anodes. The energization of the D. C. winding 18$^c$ of reactor 18 will be hereinafter described.

Motor 14 is provided with a shunt field 14$^b$ which is connected to the D. C. terminals of a full-wave rectifier bridge 20. The A. C. terminals of rectifier bridge 20 are connected to the end terminals of the aforementioned secondary winding 8 of transformer 5.

Armature 14$^a$ of motor 14 is mechanically connected to a tachometer generator 21, which is connected at its low potential armature terminal to the low potenial armature terminal of a tachometer generator 22, which may be assumed to be driven by a machine element with whose speed motor 14 is to be regulated or matched. Tachometer generator 22 is connected at its high potential armature terminal in series with a D. C. control winding 23$^a$ of a self-saturating magnetic amplifier 23, a half-wave rectifier 24, which preferably has no appreciable threshold conducting voltage in the forward direction, such as for example a germanium diode, and also in series with a resistor and the resistance element of a voltage divider 26 to the high potential armature terminal of tachometer generator 21. A half-wave rectifier 27 is connected at its high potential terminal to the point common between the high potential armature terminal of tachometer generator 22 and winding 23$^a$, and is connected at its low potential terminal to the point intermediate the resistor 25 and voltage divider 26.

As will be apparent the voltage difference between tachometer 22 and tachometer 21 is impressed across the winding 23$^a$ of magnetic amplifier 23, whenever the potential of tachometer 22 is higher than the potential of tachometer generator 21. Rectifier 24 prevents reverse flow through winding 23$^a$ in the event there is reduction in the output voltage of tachometer generator 22 below that of tachometer generator 21.

Rectifier 27 acts to limit the voltage which will appear across the series circuit comprising winding 23$^a$, rectifier 24 and resistor 25, and rectifier 27 is so chosen that it will commence to conduct only when the voltage across it exceeds a certain value as determined by the voltage rating of winding 23$^a$. Thus, any attempt to increase the voltage across rectifier 27 results in most of the current flowing through rectifier 27 and appearing as a voltage drop across the resistance element of voltage divider 26. By proper selection of the ohmic value of resistor 25 it is thus possible to keep the voltage across winding 23$^a$ to to a very low level. This not only protects winding 23$^a$ during acceleration and deceleration of motor 14, but also limits the level of ampere turns which may be developed by winding 23$^a$ in magnetic amplifier 23.

Amplifier 23 is provided with A. C. main windings 23$^c$ and 23$^d$, which are connected at corresponding ends to one end terminal of the aforementioned secondary winding 9 of transformer 5. The other end of winding 23$^c$ is connected to the low potential terminal of the half-wave rectifier 23$^e$, whose high potential terminal is connected to the output terminal 23$^f$. Terminal 23$^f$ is connected to the high potential terminal of a half-wave rectifier 23$^g$ whose low potential terminal is connected to the other end terminal of secondary winding 9. The other end of winding 23$^d$ is connected in series with the high potential terminal of a half-wave rectifier 23$^h$, whose low potential terminal is connected to the output terminal 23$^j$. Terminal 23$^j$ is connected to the low potential terminal of a half-wave rectifier 23$^k$ whose high potential terminal is connected to the last mentioned end terminal of the secondary winding 9. Output terminals 23$^f$ and 23$^j$ of amplifier 23 are connected to the end terminals of control winding 18$^c$ of saturable reactor 18. The control system as thus far described provides speed regulating control of motor 14. The system is additionally provided with current limit control which will now be described.

Amplifier 23 is provided with another D. C. control winding 23$^b$, which is connected at one end in series with a resistor 28 to the high potential D. C. terminal of a full-wave bridge rectifier 29, whose low potential terminal is connected to adjusting element 26$^a$ of voltage divider resistor 26. Winding 23$^b$ is connected at its other end in series with a resistor 30 and a half-wave rectifier 31 to the adjusting element 32$^a$ of a potentiometer 32, which has a resistance element 32$^b$. Resistance element 32$^b$ of potentiometer 32 is connected across the D. C. terminals of a full-wave bridge rectifier 33. The A. C. terminals of rectifier 29 are connected to the end terminals of output winding 11$^c$ of current transformer 11. The A. C. terminals of rectifier 33 are connected to the end terminals of the aforementioned secondary winding 10 of transformer 5. Rectifier 29 has connected across its D. C. terminals, a smoothing capacitor 34, and rectifier 33 has a smoothing capacitor 35 connected across its D. C. terminals.

As will be apparent, the upper end of control winding 23$^b$ of amplifier 23 will be subjected to the D. C. reference voltage obtaining at adjusting element 32$^a$ of potentiometer 32, and that the lower end of such control winding will be subjected to a variable D. C. voltage which is the sum of the variable voltage derived from winding 11$^c$ of current transformer 11 and rectifier 29, plus the variable voltage obtaining between adjusting element 26 and the lower end of the resistance element of voltage divider 26. Thus, whenever the magnitude of such variable D. C. voltage is greater than the D. C. reference voltage, current will flow through winding 23$^b$ to develop ampere turns, which may be assumed to counteract the ampere turns developed by control winding 23$^a$ and thereby decrease the output of amplifier 23, or even turn the latter off. The rectifier 31 prevents current flow in the reverse direction, thereby preventing winding 23$^b$ acting cumulatively with winding 23$^a$.

The operation of the system of Fig. 1 as a whole will now be described.

Assume that motor 14 is rotating at the desired speed, but with practically no load. Now let it be assumed that the armature 14$^a$ of motor 14 is gradually loaded up. This of course results in slow-down of armature speed. Accordingly, the output voltage of tachometer generator 21 decreases resulting in a voltage difference across control winding 23$^a$ which increases the output voltage across terminals 23$^f$ and 23$^j$ of amplifier 23. Thus the voltage across D. C. winding 18$^c$ of saturable reactor 18 is increased, thereby decreasing the impedance of A. C. windings 18$^a$ and 18$^b$. Consequently the alternating voltage applied to control electrodes 12$^c$ and 13$^c$ of tubes 12 and 13 will be shifted more in-phase with the anode potentials of such tubes and thus the latter will conduct over a greater portion of their conducting half cycles, thereby increasing the current supplied to armature 14$^a$ of the motor. Motor 14 will consequently increase in speed and the output of tachometer generator 21 will increase, thereby decreasing the voltage difference across winding 23$^a$ of amplifier 23 to decrease the output of the latter. Ultimately, the system will stabilize with motor 14 running at a speed only slightly less than its aforementioned no load speed.

During the aforementioned action of the control system, the current flowing through tubes 12 and 13, and hence through windings 11$^a$ and 11$^b$ of current transformer 11, causes a voltage to be developed across capacitor 34. As long as the voltage across capacitor 34 is less than the voltage across the low potential side of the resistance element 32$^b$ of potentiometer 32 no current will flow in control winding 23$^b$ because of the blocking action of rectifier 31. If the current flowing through tubes 12 and 13 increases sufficiently so that the voltage across capacitor 34 exceeds the reference voltage afforded by potentiometer 32, then the current which flows in winding 23$^b$ will tend to reduce the voltage output of amplifier 23, and hence the voltage output to armature 14$^a$ of the motor.

Reduction in the applied voltage on the motor armature tends to decrease the motor speed, and hence the speed and voltage output of tachometer generator 21. The resultant increase in differential voltage across winding 23$^a$ will tend to increase the voltage output to the motor armature to maintain the speed, which action is opposed to the aforementioned action produced by the increasing current flow in tubes 12 and 13.

Since the current limit action is a safety feature it is made to predominate over the speed regulating action. To further limit the speed regulating action, when excessive values of current are reached in the motor armature current, rectifier 27 conducts to limit the differential voltage applied across winding 23$^a$, and a voltage proportional to the excess differential voltage, appearing across the resistance element of voltage divider 26 is added to the voltage appearing across capacitor 34 to aid in current limit action. This summation of voltages during current limit action results in a very definite current value, above which, the control system is responsive only to the current limit portion of the control system, and the output voltage of amplifier 23 is decreased to whatever value is necessary to maintain the current flowing in the motor armature at the limiting value. Below such limiting value, the control system is responsive only to the speed regulating portion thereof.

Figure 2:
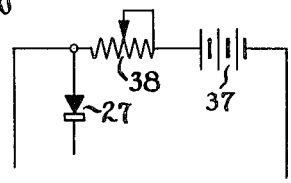
Fig. 2 depicts a modification of a part of the control system of Fig. 1.

While in the system of Fig. 1 the tachometer generator 22 has been described as a source of reference voltage in the speed regulating voltage comparison circuit, it will be apparent that any other suitable source of D. C. reference voltage, such as for example the series connected battery 37 and adjustable resistor 38 shown in Fig. 2 can be used in place thereof.

In Fig. 3 there is shown a form of the speed regulating and current limit control system as applied to an adjustable voltage drive. It will be noted that elements of the system in Fig. 3, which are identical to those in Fig. 1 are given corresponding reference numerals. The adjustable voltage drive comprises a D. C. motor 40, having an armature 40$^a$ connected in a loop-circuit with the armature 41$^a$ of a D. C. generator 41. D. C. control windings 42$^a$ and 42$^b$ of a saturable reactor 42 are connected in series in the loop-circuit, and provide a source of current limit signal.

Motor 40 is provided with a shunt field winding 40$^b$ which is connected at one end in series with an adjustable resistor 43 to the high potential D. C. terminal of a full-wave rectifier bridge 44, and is connected at its other end to the low potential D. C. terminal of rectifier 44. Rectifier 44 has its A. C. terminals connected to a secondary winding 45 of a transformer 46, having a primary winding 47 which may be assumed to be connected to a suitable source of alternating voltage supply. Transformer 46 is provided with other secondary windings 48, 49 and 50. Generator 41 is provided with a shunt field winding 41$^b$ which is connected to output terminals 23$^f$ and 23$^j$ of amplifier 23.

Saturable reactor 42 is provided with a pair of series connected A. C. windings 42$^c$ and 42$^d$, and one end thereof is connected to one end terminal of secondary winding 48 while the other end of such series connected windings is connected to one A. C. terminal of rectifier 29. The other A. C. terminal of rectifier 29 is connected to the other end terminal of secondary winding 48.

Secondary winding 49 provides the source of A. C. input for amplifier 23, with one end terminal being connected to corresponding ends of windings 23$^c$ and 23$^d$, and the other end terminal being connected to the low and high potential terminals of rectifiers 23$^g$ and 23$^k$, respectively. The A. C. terminals of rectifier 33 are connected to the end terminals of secondary winding 50.

The operation of the speed regulating and current limit portions of the control system of Fig. 3 will be like that of the embodiment of Fig. 1, except that their effect on the motor 40 will be intermediately through control of armature voltage of generator 41.

I claim:

1. In a control system for an electric motor whose armature is supplied with voltage by means adjustable to vary the magnitude of such voltage, the combination with an amplifying regulator having its output in circuit with said means to afford adjustment of the latter, and having a control winding, of a source of reference voltage, a generator driven by said motor, and a circuit inclusive of said source, said generator and said control winding for subjecting the latter to the voltage difference between said source and said generator, and further including an element rendered conductive upon attainment of a given voltage difference to shunt flow of a greater portion of the circuit current around said control winding.

2. The combination according to claim 1 wherein said source, said control winding and said generator are connected in a single loop, and said element is connected in shunt with said control winding.

3. The combination according to claim 2 wherein said element is a unidirectional conducting element, and said loop also contains a unidirectional conducting element.

4. In a control system for an electric motor whose armature is supplied with voltage by means adjustable to vary the magnitude of such voltage, the combination with an amplifying regulator having its output in circuit with said means to afford adjustment of the latter, and having two control windings, of a generator driven by said motor, a source of reference voltage, a circuit inclusive of said source, said generator and one of said control windings for subjecting the latter to the voltage difference between said source and said generator and further including an element rendered conductive upon attainment of a given voltage difference to shunt flow of a greater portion of circuit current around said one control winding, means affording a voltage proportional to the motor armature current, a second source of reference voltage, and a second circuit inclusive of the last mentioned means, said second source and the other of said control windings for subjecting the latter to the voltage difference between said last mentioned means and said second source.

5. The combination according to claim 4 together with means in circuit with said first and second circuits to supplement said voltage proportional to the motor armature current with a voltage proportional to the voltage difference between said generator and the first mentioned source.

6. The combination according to claim 5 wherein said second source is adjustable to afford selection of the reference voltage value.

7. The combination according to claim 5 wherein said generator, the first mentioned source and said one control winding are connected in a loop in the first mentioned circuit, and wherein said element is a unidirectional conducting device connected in shunt across said one control winding.

8. The combination according to claim 7 wherein said regulator is a magnetic amplifier.

9. The combination according to claim 8 wherein the first mentioned means comprises a pair of electron tubes having their discharge paths in circuit with the motor armature and a phase shift network in circuit with the control electrodes of said tube and including a saturable reactor with its control windings connected to the output of said magnetic amplifier.

10. The combination according to claim 8 wherein the first mentioned means comprises a generator having its armature connected in a loop-circuit with the motor armature, and having a field winding connected to the output of said magnetic amplifier.

References Cited in the file of this patent

UNITED STATES PATENTS

| | | |
|---|---|---|
| 2,235,551 | Garman | Mar. 18, 1941 |
| 2,237,985 | Garman | Apr. 8, 1941 |
| 2,383,722 | Haug | Aug. 28, 1945 |